J. H. BECKMAN.
AUTOMOBILE TURNING APPARATUS.
APPLICATION FILED AUG. 6, 1917.

1,286,504.

Patented Dec. 3, 1918.
3 SHEETS—SHEET 1.

Inventor
Jacob H. Beckman
By Henry L. Reynolds,
Attorney

J. H. BECKMAN.
AUTOMOBILE TURNING APPARATUS.
APPLICATION FILED AUG. 6, 1917.

1,286,504.

Patented Dec. 3, 1918.

Inventor
Jacob H. Beckman
By Henry L. Reynolds
Attorney

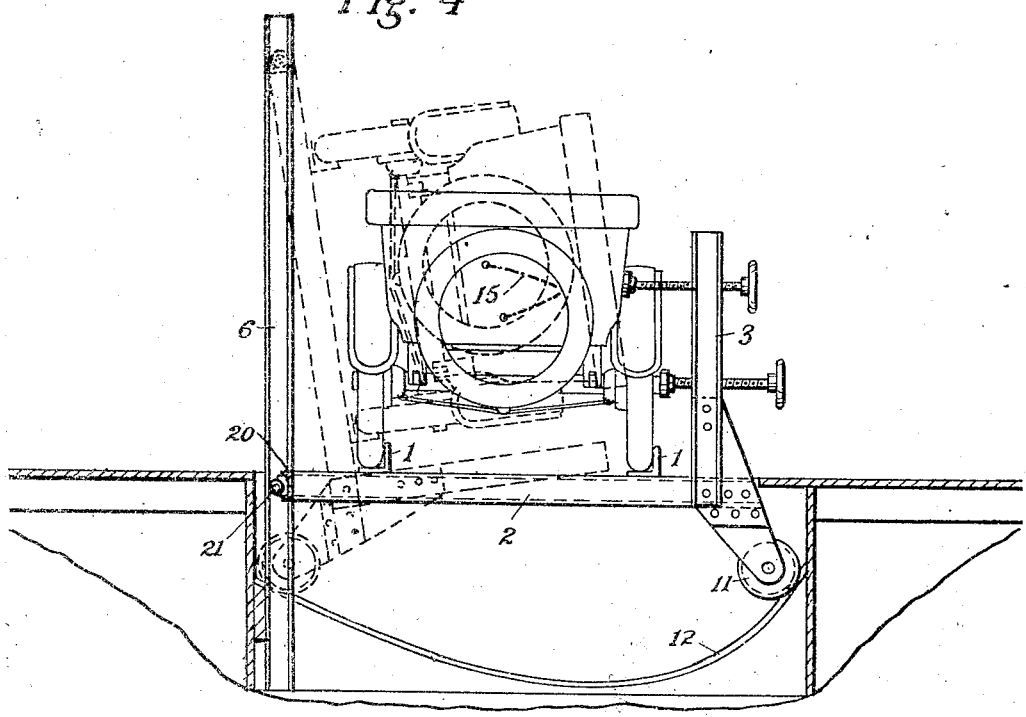
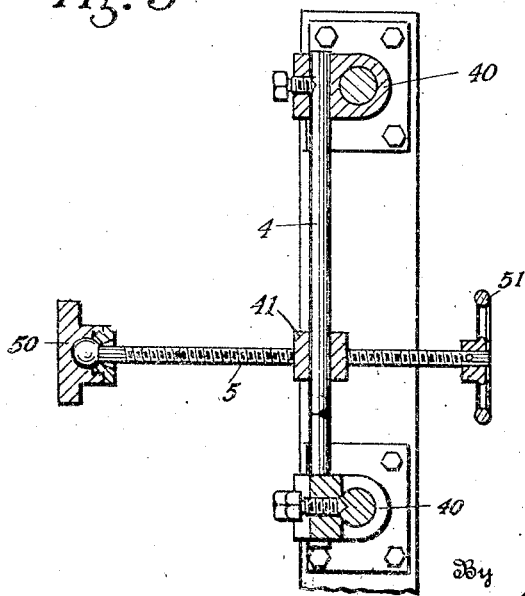

UNITED STATES PATENT OFFICE.

JACOB H. BECKMAN, OF SEATTLE, WASHINGTON.

AUTOMOBILE-TURNING APPARATUS.

1,286,504.     Specification of Letters Patent.     Patented Dec. 3, 1918.

Application filed August 6, 1917. Serial No. 184,730.

*To all whom it may concern:*

Be it known that I, JACOB H. BECKMAN, a citizen of the United States, and resident of the city of Seattle, county of King, and State of Washington, have invented certain new and useful Improvements in Automobile-Turning Apparatus, of which the following is a specification.

My invention relates to devices which are designed to be used for turning an automobile upon its side and holding it in this position so that the under parts thereof may be conveniently accessible for examination and repair.

The object of my invention is to provide a device of this kind which will be convenient in operation and simple in its construction. The features of my invention, which I claim as new, will be defined by the claims terminating this specification.

In the accompanying drawings I have shown my invention in the form preferred by me.

Fig. 4 is an end view of a slightly modified form of construction, the turned position of the automobile and the associated parts, being shown by dotted lines.

Fig. 5 is a sectional elevation taken through the vertical portion of the frame at one side, which is used for supporting the side of the car.

Figure 1:
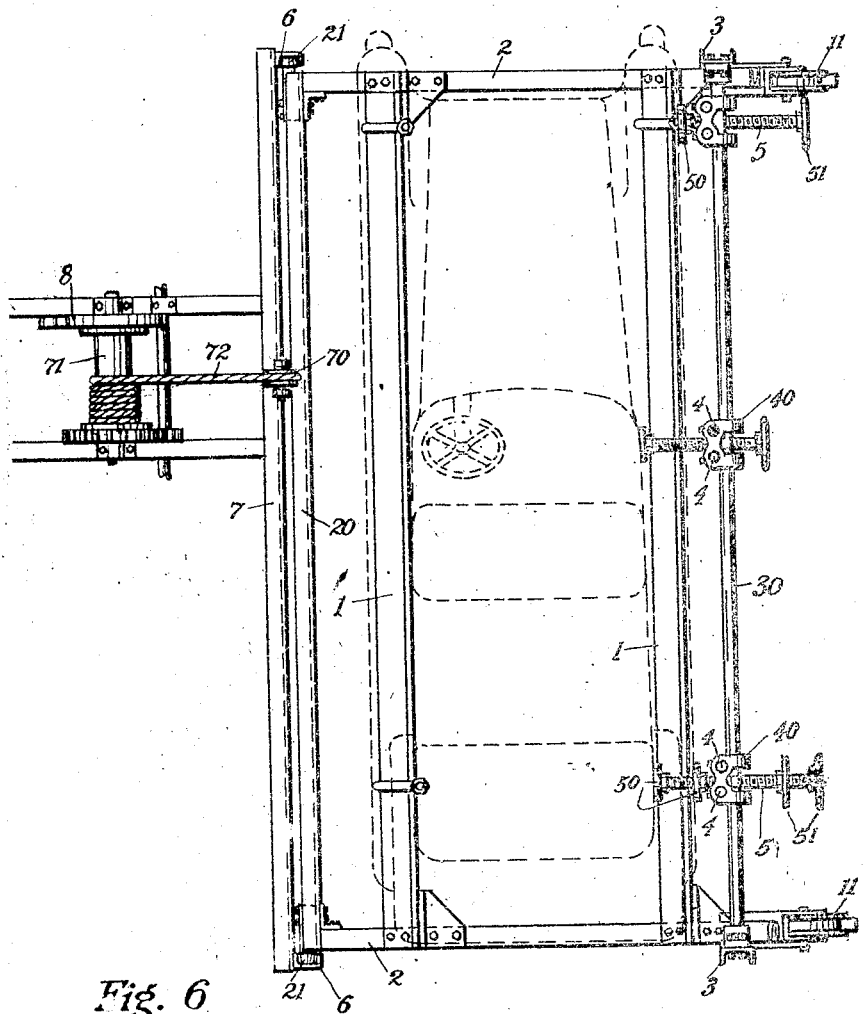
Figure 1 is a top plan view of the device, an automobile being shown in outline by dotted lines.

In the drawings 1 represents trackway members upon which the wheels of the automobile are placed before it is to be turned upon its side. These trackway members are herein shown as in the form of angle bars. While I prefer to use an angle bar for this purpose, it is evident that other types of bars may be employed. The choice of an angle bar for this purpose is determined by the fact that it has a side flange which will support the side of the automobile tire and rim when the car is placed upon its edge.

Two of the trackway members 1 are employed. These are herein shown as connected by their ends to two bars, or beams 2, which extend transversely of the length of the car. These are herein shown as channel bars. The type of beam employed is, however, immaterial. I have also shown a bar 20 extending lengthwise of the device and secured to the ends of the beams 2 with which I have indicated the engagement of the means for applying power to the device in order to turn it.

Secured to the other ends of the beams 2 are posts 3. These posts extend upwardly adjacent the side of the car and serve as a means through which the car is supported, at least in part, when it is turned upon its edge. Supported upon these posts 3 are two horizontally extending bars 30. One of these is placed toward the top of the posts and the other toward the bottom.

Mounted to slide upon the horizontal bars 30 are blocks 40, each of which are secured thereto, two vertical bars or posts 4, these being parallel and slightly separated. Mounted to slide vertically upon the bars 4 are a set of blocks 41, through each of which horizontally passes a threaded bar 5. Block 40 is correspondingly threaded and serves as a supporting nut for the bar 5. Each bar 5 is provided, upon the end which faces toward the car, with a block 50, which is preferably mounted thereon by a ball-and-socket joint, so that it may adjust itself to serve in various positions. Each threaded bar 5 is provided with a wheel 51 by which it may be readily turned, or with any other suitable equivalent mechanism.

Extending downward and laterally outward from the frame above described, are arms 10 which, at their lower end, have wheels 11 journaled thereon. These wheels bear upon trackways 12 which extend transversely the length of the car. At the other side of the frame small rollers or wheels 21 are secured upon horizontal axis. These are adapted to have a restrained movement in an upward direction, as by fitting within the space between the flanges of a channel bar 6, which channel bar is fixedly secured, The object of this is to provide a means for securing vertical movement of this edge of the frame within definite paths. Other mechanisms than that described may be employed if they secure the same results.

A rope or cable 72 is secured to the bar 20 of the frame. This passes over a pulley 70, which is supported in elevated position, as by the bar 7, which is secured to the upper ends of the post 6. This rope may be handled by any suitable means. I have shown it as passing about a small drum or windlass 71 which is mounted in elevated position and which may be operated in any suitable manner. This windlass is preferably provided with a brake drum and band 8 which is controlled by a handle 81.

Figure 6:
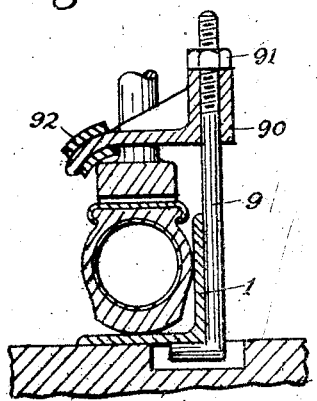
Fig. 6 is a section, showing in detail, a type of mechanism which may be employed for securing the wheels of the automobile to the trackway, by which the car is supported.

In Fig. 6 I have shown means whereby the wheels of the car may be secured down upon the angle bars 1. This means consists of a bolt 9, which has its head end laterally bent to fit under the angle bar 1. This has mounted thereon a claw 90 which may be adjusted lengthwise upon the bolt and which is of such length as to extend over the rim of the wheel, that is, within the rim of the wheel, and engage the same to hold it down. This may be clamped down by a nut 91 upon the bolt. The engaging end of the claw 90 may be provided with a pad 92 which will prevent marring the rim of the wheel.

Figure 2:
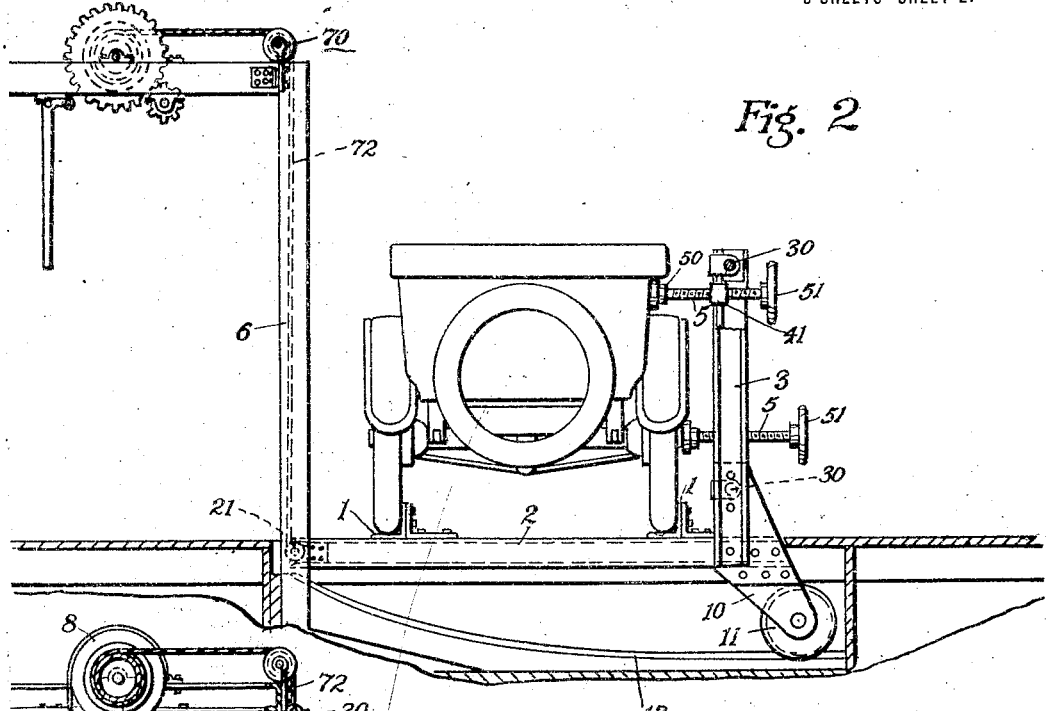
Fig. 2 is an end elevation of the device, showing an automobile in place, before being turned.
Figure 3:
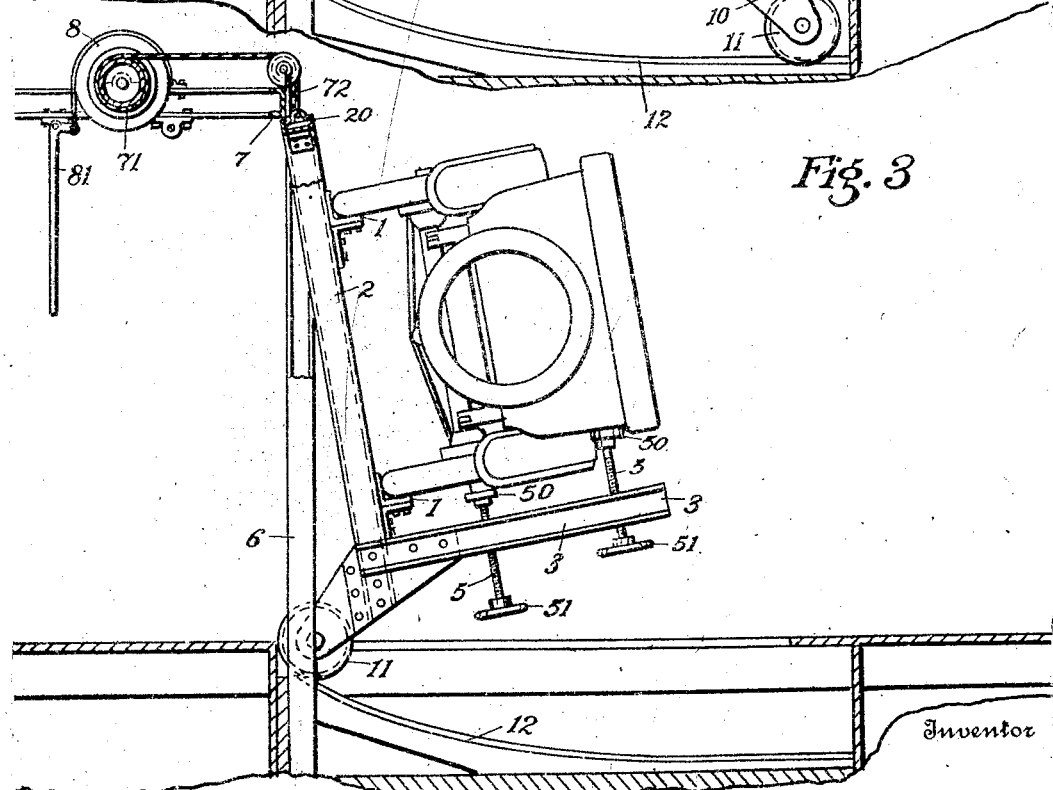
Fig. 3 is a like view showing the automobile turned upon its side.

In Figs. 2 and 3 I have shown the trackway 12, upon which the supporting wheels at one side of my device may move, as being horizontal at the end where the wheel would rest when the car is in upright position. This trackway, preferably, is inclined upward toward the other end. The curvature of the trackway, shown in Figs. 2 and 3, will work satisfactorily in many cases. In Fig. 4 I have, however, shown a form of trackway which has certain advantages. This trackway is higher at its ends than its middle portion. As the side of the frame to which the hoisting rope is attached is lifted, the wheels 11 run down the incline, and as the car approaches a position upon its edge the same wheels travel up the incline. The dot and dash line 15 shown in Fig. 4, represents approximately, the movement of a point which is assumed as representing the center of gravity of the car.

It will be found that while the car is being turned over upon its edge, this point is constantly rising and is constantly falling while the car is falling back, or to its upright position. A curve somewhat after the shape of that shown in Fig. 4 tends to reduce the effort required to turn the car upon its edge and also the effort required to restore it to vertical position.

The operation of this device is evident. The car is first run upon the bars 1 and the wheels secured thereto by the clamping means shown in Fig. 6, or by any other suitable and desired means. The side of the car which is to be down when turned, is then engaged by the supporting mechanism, shown in detail in Fig. 5. These blocks 50 may be adjusted to any position so as to engage any part of the car desired. After these have been put in place against the side of the car, the opposite side of the car is lifted, which turns the car in a manner which is evident. This places the car in convenient position for obtaining access to the under side thereof. After any work of this kind, which it is desired to do, is finished, the car is then lowered to normal position.

What I claim as my invention is:

1. In a device of the character described, a structure adapted to receive and support an automobile for turning upon its side, guides extending upwardly at one side of said structure with which said structure has positive guiding engagement, wheels journaled beneath the opposite side of said structure, and transversely extending trackways for said wheels having their ends which are adjacent to the upwardly extending guideways curving upwardly.

2. In a device of the character described, a frame having thereon wheel-receiving plates having flanges extending alongside the wheels, and bars extending adjacent to one side of the car, means carried by said latter bars for supporting the car when it is turned upon its side, arms extending downwardly and in a lateral outwardly direction from this side of the frame, wheels carried by said latter arms, upwardly concaved trackways for said wheels, and means for raising the opposite side of the frame.

3. In a device of the character described, a frame having longitudinal wheel-receiving angle bars, transverse connecting bars, and posts extending upward from one end of said transversely extending bars, means carried by said posts for supporting a car from its side, wheels carried by the side of the frame to which the posts are secured, transversely extending trackways for said wheels, means for raising the opposite side of the frame, and vertical guides for said latter side of the frame.

4. In a device for turning cars, a frame provided with means for securing a car thereto, means for vertically guiding one side of said frame, hoisting means engaging this side of the frame, trackways extending transversely beneath the frame and having the end thereof next to said vertical guides inclined upward and supporting wheels secured to the opposite side of the frame and treveling on said trackways.

5. In a device for turning automobiles, in combination, a frame L-shaped in cross section, one side of said frame having a trackway for the automobile wheels, and means for securing the wheels to said trackway, side supports for the automobile carried by the other side of the frame, trackways extending transversely beneath this frame, wheels for said trackway carried by the side of the frame having said side supports, upwardly extending guideways engaging the side of the frame opposite from said side supports, and means for hoisting and lowering this side of the frame under control of the guideways.

Signed at Seattle, Washington, this 31st day of July, 1917.

JACOB H. BECKMAN.